(12) United States Patent
Sithes

(10) Patent No.: US 8,247,738 B2
(45) Date of Patent: Aug. 21, 2012

(54) WELDING BOOTH

(76) Inventor: Edwin F. Sithes, Wake Forest, NC (US)

(*) Notice: Subject to any disclaimer, the term of this patent is extended or adjusted under 35 U.S.C. 154(b) by 393 days.

(21) Appl. No.: 12/691,281

(22) Filed: Jan. 21, 2010

(65) Prior Publication Data

US 2010/0258546 A1 Oct. 14, 2010

(51) Int. Cl.
*B23K 9/00* (2006.01)
(52) U.S. Cl. .................. 219/136; 219/137.41; 454/56
(58) Field of Classification Search .............. 219/136, 219/137.41; 454/56
See application file for complete search history.

(56) References Cited

U.S. PATENT DOCUMENTS

| | | | |
|---|---|---|---|
| 4,359,330 A | 11/1982 | Copley | |
| 4,606,260 A | 8/1986 | Cox | |
| 6,036,736 A | 3/2000 | Wallace et al. | |
| 6,758,875 B2 | 7/2004 | Reid et al. | |
| 6,783,054 B1* | 8/2004 | Pregeant et al. | 228/102 |
| 7,238,916 B2* | 7/2007 | Samodell et al. | 219/125.1 |

* cited by examiner

*Primary Examiner* — Tu-Tu Ho
(74) *Attorney, Agent, or Firm* — James G. Passé; Passé Intellectual Property, LLC

(57) ABSTRACT

The present invention relates to a welding booth that has a small foot print and can be joined to other booths for maximization of floor space use.

10 Claims, 5 Drawing Sheets

WELDING BOOTH

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to air cleaning systems for welding chambers. In particular, the present invention relates to an air cleaning system booth, a small footprint and the ability to have many units in a confined area without substantial air handling problems.

2. Description of Related Art

The welding of metal parts and welding to build products is an inherently dangerous endeavor. Not only are the sparks and hot metal pieces easy to start fires, cause burns, and the like, but the gases and dust created during the welding process can be toxic, as well as detrimental, to the product being produced. Generally, welding is carried out in a welding chamber, which controls dust and particulate matter generated by the process of circulating and filtering the air that enters the welding chamber before returning it to the surrounding environment.

Older welding chamber air filtration systems consist of an air cleaning system, which is positioned on the floor just outside the welding chamber. They are connected to the air flow from the welding chamber by one or more air hoses. Not only does this older system waste valuable floor space, but it adds considerably to the maintenance and cleaning of a welding system.

A more recent approach to air handling systems for welding chambers, which is superior in many ways to the side mounted units, has been the introduction of the overhead air cleaning system for welding stations. These air cleaning systems have the ability to be in direct connection with the interior of a chamber, eliminating the need for ducting, and also eliminate many of the other problems associated with side mounted air systems and lengthy ducted systems.

The air cleaning systems contain one of a variety of different types of air filtration devices. One cleaning filter method, in addition to standard charcoal, HEPA and other filter units, is the self cleaning pulsed air filter. These filters comprise a paper or cloth filter, which air moves through trapping particles. At desired intervals, a pulse of reverse flow air is blown through the filter, releasing the trapped particles for collection below the filter. Typically, air cleaning systems provide a door, which must be opened and a collector below the air filter also must be handled and cleaned. These work well, but expose the worker who cleans the unit to the filter and interior of the filter chamber every time the tray needs to be cleaned, exposing the worker and surrounding environment to a higher level of contaminants. In U.S. Pat. No. 4,359,330 issued Nov. 16, 1982 to Copley, there is disclosed a self cleaning pulsed air cleaner designed for use in air cleaning systems. The system describes methods for preventing the recontamination of the air filter after it has been pulsed but, nothing to prevent exposure to the filter every time the collection tray is cleaned.

In addition to a wide variety of filters, there are several different approaches to the air cleaning system. In U.S. Pat. No. 6,036,736 issued Mar. 14, 2000 to Wallace, et al., there is disclosed a ventilating method wherein an air blower, suitable for fumes filtered by a contaminate filter, a charcoal filter, and a HEPA filter is disclosed. The device is mounted on top of a framed box and includes spark arrestor means. In U.S. Pat. No. 4,606,260 issued Aug. 19, 1986 to Cox, there is disclosed a movable welding station with a top frame mounted exhaust hood, including charcoal filters. In U.S. Pat. No. 6,758,875 issued Jul. 6, 2004 to Reid et al., there is disclosed a top frame mounted air cleaning system. The system includes a blower housing, frame, filters, shields, and a spark arrestor. This particular air cleaning system has a framing system for supporting the air cleaning on top of the cabinet. The support consists of corner posts with a top corner to corner cross member of long, heavy, metal "beams". The beams are indicated as relatively tall, and in some embodiments, must be further supported by cross posts (i.e., cross members like the upright posts which add support to the heavy beams of the invention, FIG. 1 and FIG. 2). Upright posts and cross beams are a fairly standard construction method for framing systems in general, and as with any older technology, present a variety of problems including their size and greater weight.

These booths all tend to take up much room on the floor, and are not very cost effective for smaller welding jobs. The problems of the present state of the art would be a greatly reduced different type of welding chamber than currently in use.

BRIEF SUMMARY OF THE INVENTION

The present invention relates to a new type of welding chamber that, while it can stand alone, allows for a reduced space when multiple chambers are used. The particular configuration is designed such that either side-to-side, back-to-back, or both configurations can be achieved with multiple booths of the present invention.

Accordingly, in one embodiment of the present invention, there is disclosed a welding booth designed to attach to one or more like welding booths comprising:
 a) a left and right side panel wall;
 b) a back work panel wall comprising one or more adjustable slots and a duct support mounted to a top surface of the panel;
 c) a plurality of leveling feet; and
 d) a roof positioned on the top surface of the side and back panels with a roof mounted exhaust extraction port;
wherein the side and back panels are adapted, such that a side or back panel can become the side or back panel of a second welding booth attached to the welding booth.

DETAILED DESCRIPTION OF THE INVENTION

Figure 1:
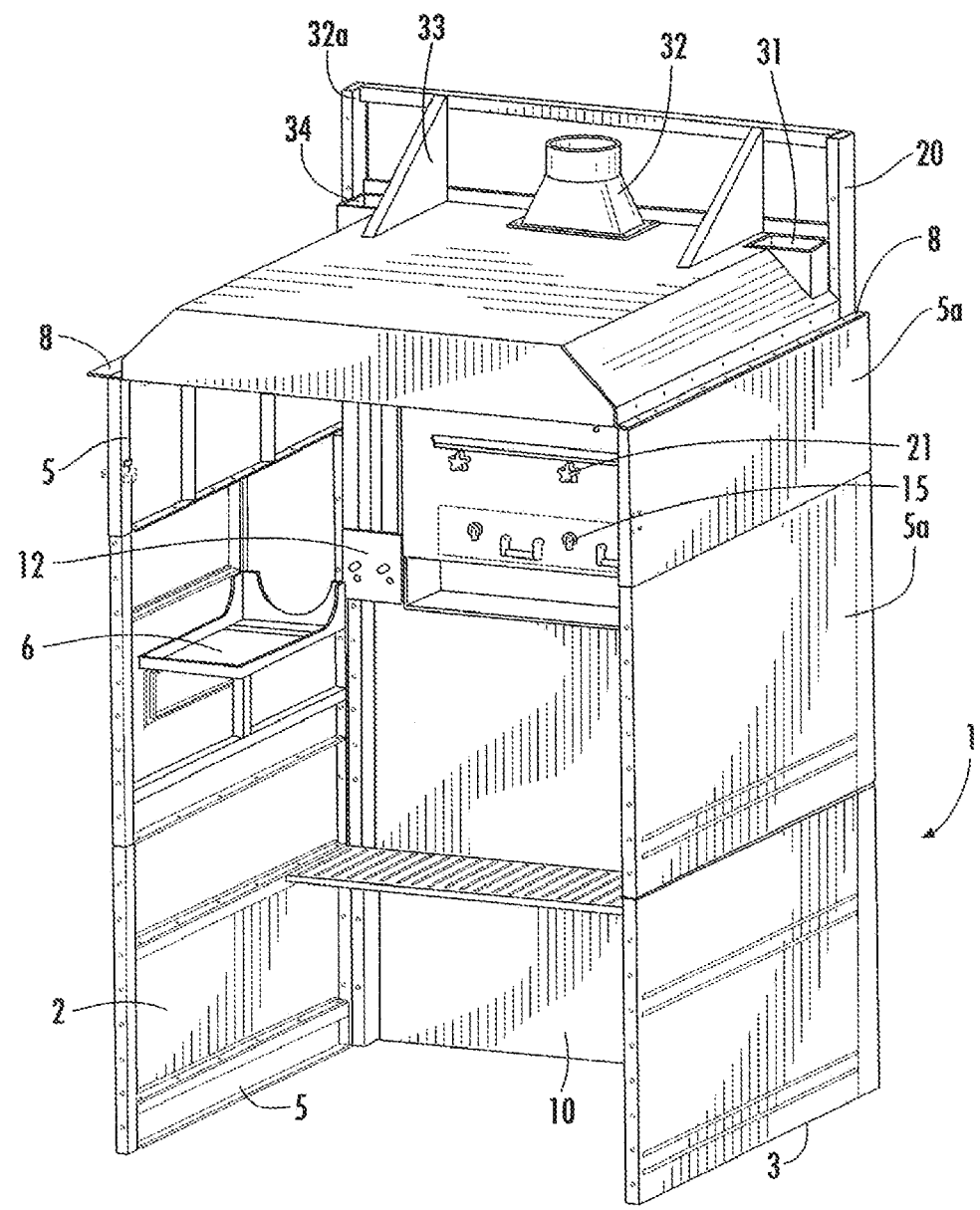
FIG. 1 is a front perspective view of a welding booth of the present invention.

While this invention is susceptible to embodiment in many different forms, there is shown in the drawings, and will herein be described in detail specific embodiments, with the understanding that the present disclosure of such embodiments is to be considered as an example of the principles, and not intended to limit the invention to the specific embodiments shown and described. In the description below, like reference numerals are used to describe the same, similar, or corresponding parts in the several views of the drawings. This detailed description defines the meaning of the terms used herein, and specifically describes embodiments, in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein, the term "welding booth" refers to a chamber enclosed on 3 sides used for welding and for containing the sparks and/or air emissions caused by the welding activity. In the present invention, they are designed for smaller welding jobs, and unlike large cabinets designed for large robotic welding jobs that are enclosed on 4 sides. These booths typically have a relatively small footprint on the floor of around 3 or 4 feet on a side to no more than about 10 or 12 feet on a side. Where appropriate, these chambers could also be used for welding by either a small robotic or a non-robotic means, but in general, designed for operator welding small items because of the smaller size. The welding booth can accommodate smaller jobs than high volume booths, and have the advantage of operating in a smaller warehouse floor area. The welding booth normally consists of an enclosure, consisting of 3 panel sides and a roof mounted on the panels to form and define the enclosure. There is no frame structure like larger welding chambers designed for large robotic applications. In some embodiments, the paneling is solid metal or the like. In one embodiment, the panels are welding steel that is optionally powder coated. As will be shown in the figures, the booths have the advantage of being placed next to one another, or even wall sharing to take up even less floor space.

The "left and right side panel walls" are essentially identical. A panel is essentially a welded steel (tubing and sheet), powder coated panel wall. Other materials can be utilized, however, steel is presently cost effective and works in this environment. By making them essentially identical inside, two booths can use a common side panel if desired, though walls can be single or double as desired, thus, saving on materials, and not wasting floor space by needing floor space in-between each booth. While a single booth could be free standing, the great advantage of the present invention is the shared wall option. In the shared wall option, two welding booths of the invention share a wall. The left and right walls of the two booths are the same wall. This can be clearly seen in the drawings of the present invention. The panels each have leveling feet. These feet create a space underneath the bottom of the side panels for air circulation, and in addition allow for leveling of the booth on uneven surfaces.

The "back work panel wall" is the third center panel of the booth. The present booth has no front wall. The back wall and left and right side walls can be attached to one another to create a free standing three wall structure. In other embodiments, the roof attaches to the top surface of the side and back panels to hold them together, and in yet another embodiment, both methods are used to hold the panels together and the structure upright and in a squared off configuration. The back wall is also optionally outfitted with one or more adjustable slots for regulating air circulation in and out of the booth. This can be used to balance air flow and air pressure within the booth. The slots can also be positioned in the roof, but the booth is fitted with at least one of these slots in the back wall or roof. An adjustable slot is an opening that can be adjustably opened or closed to the opposite outside of the panel to allow air circulation to pass through the back panel (or roof) as desired. The back panel also is outfitted with leveling feet, which accomplish the same function as the side panels. Note that in one embodiment, the back wall as well as the side walls can be predrilled for side-to-side or back-to-back use, where the walls are used together and not shared. The back wall is engineered to support overhead ducting, wiring, gas lines and the like, without additional structures and/or hanging anything from the ceiling for support.

The roof of the present invention is outfitted with a means of resting on the top surface of the two sides and one back panel. As can be seen in the figures, which accompany, the bottom of the roof can be fitted with a slot or bracket, so that the roof stays in place when placed on the 3 walls. The roof can also be screwed, welded, or otherwise attached to the walls as desired. The roof can be a flat type roof, or can be a built up roof as is typical in many welding cabinets of larger size. The recess in the roof can be outfitted with lighting, ductwork, or the like, as well as air flow pass through slots as in the back wall. The roof on its top surface has a vent exit, which passes down to the booth interior. In order for several booths to be used together and to string exhaust tubing along the top of the booths, the back panel is outfitted with a support bracket for supporting exhaust vents (tubing) along the width of the booth while some attachment can partially be to the roof, the back wall placement allows for better support and better usage for booths placed back to back. By supporting the vents on the back wall instead of the roof, they can be strung together easier, and provide more support than those mounted directly on the roof. Multiple connected booths can then be attached by sharing a common side wall or back wall, as desired. While they can also be attached without sharing a common wall, the sharing allows for a reduction in expense, when utilizing the booths together. In other embodiments it's possible to utilize a roof mounted filtration system, such as filters. These systems are known in the art however it's possible to use a single filtration unit mounted to span two or more booths thus saving money and equipment, something not achieved in previous welding system enclosures.

Now referring to the drawings, FIG. 1 is a front angle perspective of the welding booth of the present invention. Welding booth 1 consists of left panel 2 and right panel 3. Panels 2 and 3 are constructed of a square tubing frame 5 covered with a steel sheet coating 5a, and the entire exposed surface powder coated as desired. As can be seen, the frame left panel 2 supports a CO2 bracket 6 for placing a CO2 canister and positioned between left panel 2 and right panel 3 is shelf 7.

Likewise, back panel 10 is tubing and sheet metal covered with a powder coating, but has several additional accessories. There are quick connectors 12 for gas, such as CO2 or air. There is also an open shelf 13, and right above that, a dust clean out drawer 15 for collecting heavier dust. The adjustable air slots 20 with adjustment handles 21 can be seen in this view. The roof 30 is supported on tops 8 of the left 2 and right 3 panels as well as the top of back panel 10 not seen in this view. The roof 30 has electrical connection box 31 positioned in the back right corner for routing electrical and for a working light. The back left corner has quick connect inlets 34 for attaching gas to feed connectors 12 inside the booth 1. Also seen in this view is exhaust port 32. This connector can be attached to exhaust tubing and a motor to suck air out of the booth 1. The exhaust tubing brace 32a is shown in this embodiment as spanning the entire width of the booth along the back wall 10, and supported on the top of that wall as well as attached to the roof 30 of the invention booth 1. In order to further brace this embodiment, triangular braces 33 are placed on roof 30, and welded in place to give lateral support to the brace 32.

Figure 2:
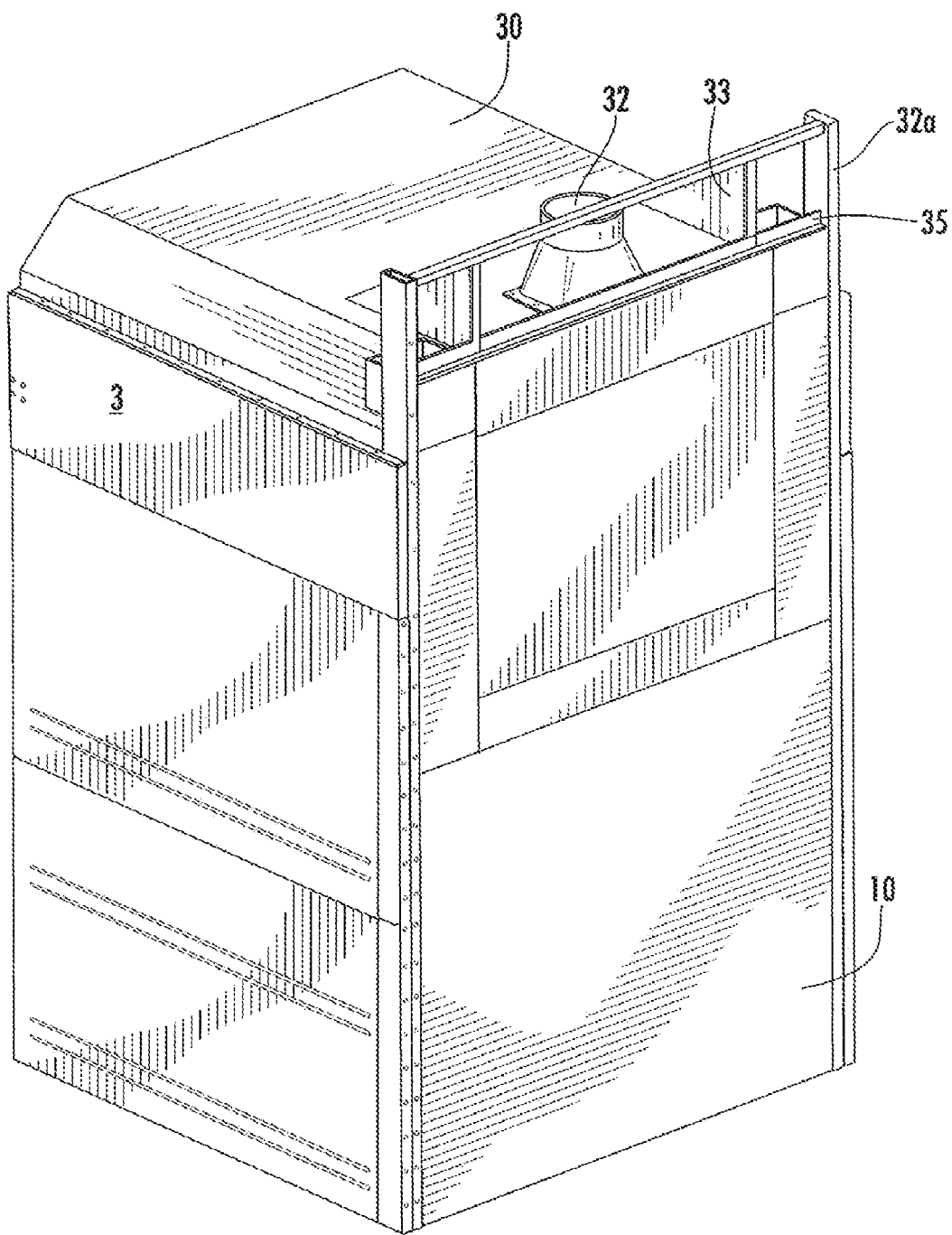
FIG. 2 is a back perspective view of a welding booth of the present invention.
Figure 3:
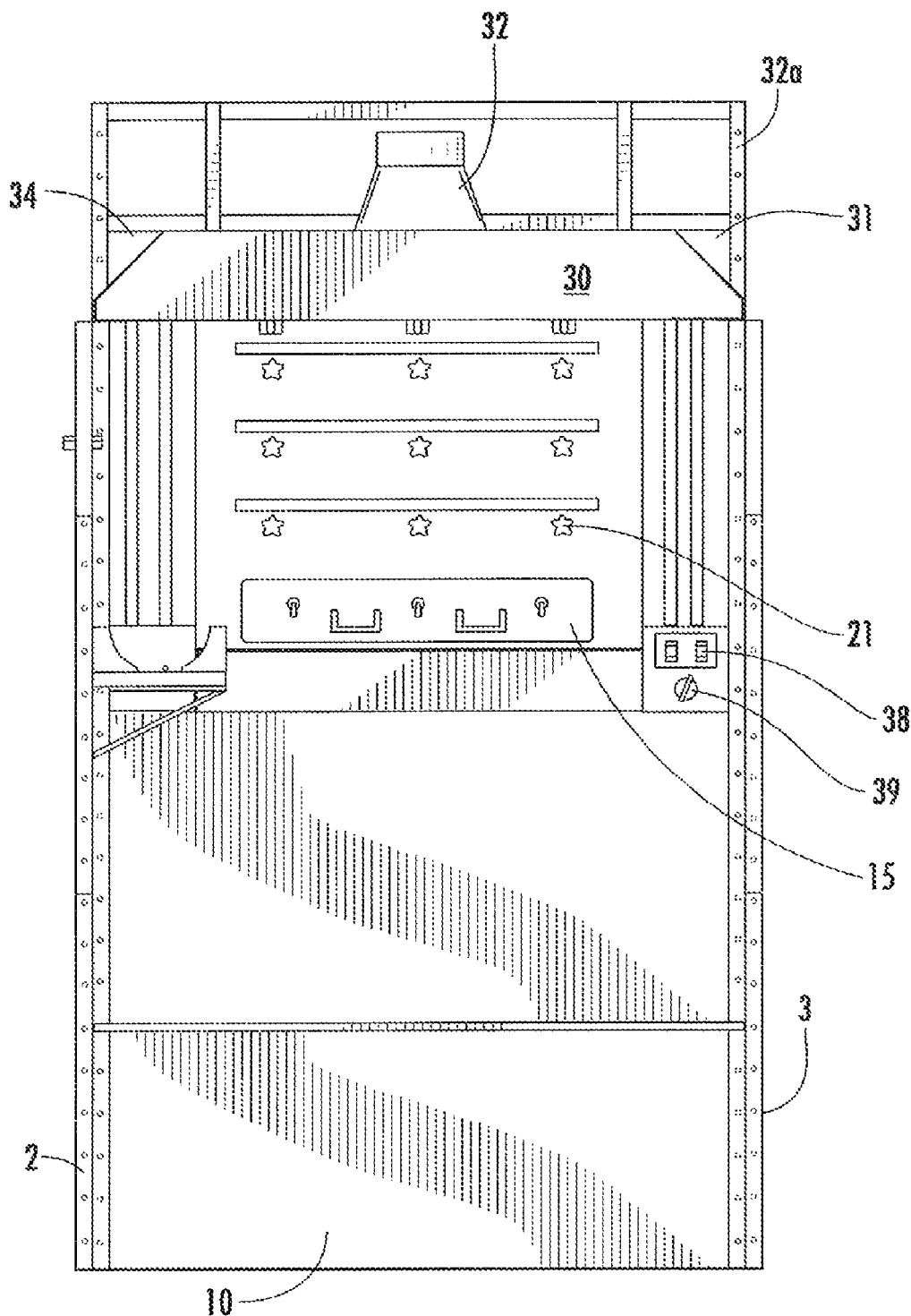
FIG. 3 is a front view of the back panel.

FIG. 2 shows a back angle perspective view of booth 1. In this view, the top of back panel 10 can be seen. It is noted that while the two side panels are the same height in this view, the back panel 10 is taller. Note that the top of back panel 35 can also be seen in this view. FIG. 3 is a full frontal view of the present invention, in addition to multiple adjustable slots 20. This view shows the entire interior portion of booth 1. In this view, electrical outlets 38 and electric light switch 39 can be seen. The light is recessed up inside the roof in this embodiment.

Figure 4:
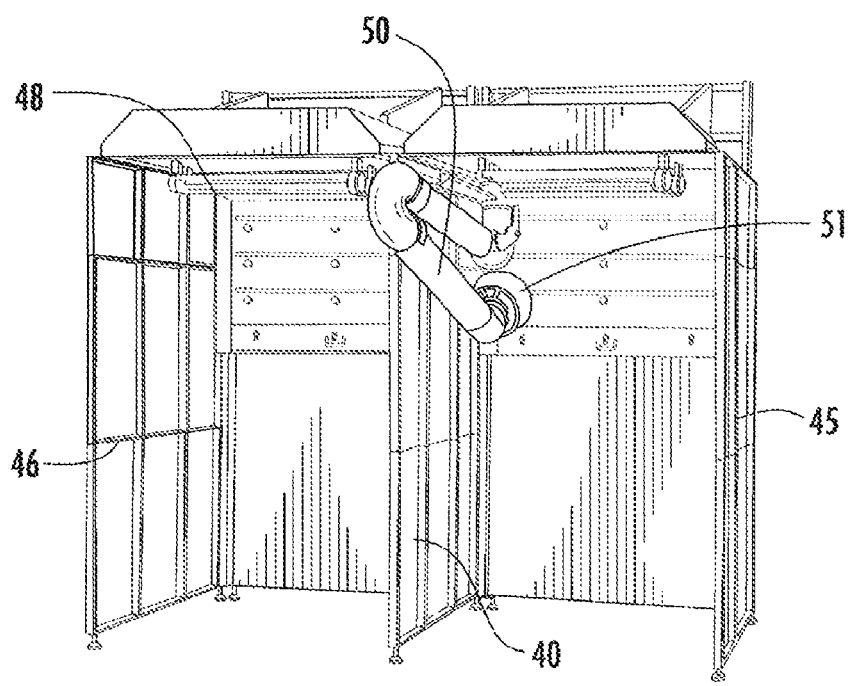
FIG. 4 is a perspective view of two connected booths with one booth comprising a fume arm.

FIG. 4 depicts an embodiment with side-to-side configuration of two units sharing a single side wall. Note wall 40, which is the left wall of booth 45 and the right wall of booth 46. This view is from a lower perspective than the previous figures, such that one can see up into the roof, where recess or hanging light fixture 48 can be seen. This view has booth 45 equipped with a retractable fume arm 50. This arm has the ability to be repositioned as necessary during use, and the small suction head 51 positioned next to the job. Typically fume arms have about a 4 to 8 inch capacity in this environment. With one embodiment being a 6 inch fume arm (referring to diameter). It is clearly designed for small welding jobs as is the entire booth of the present invention.

Figure 5:
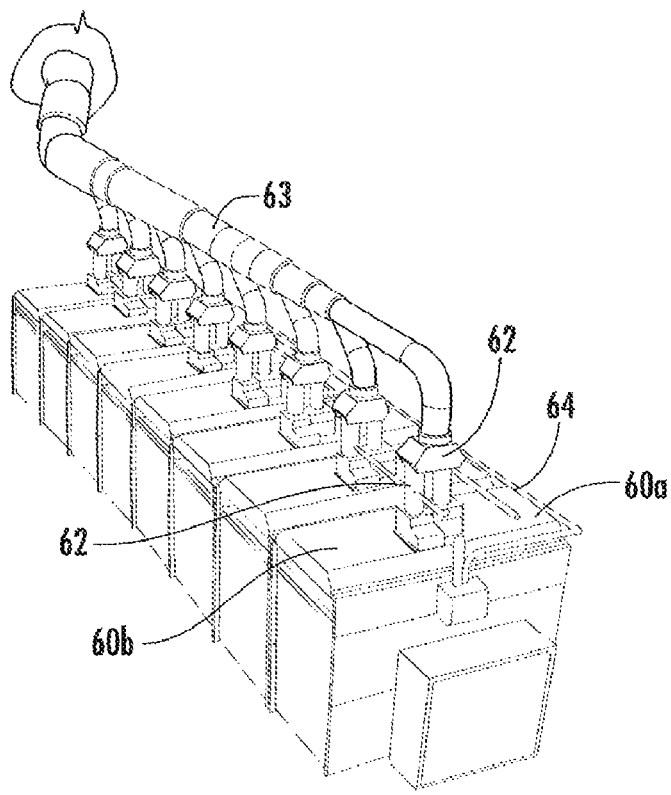
FIG. 5 is a perspective view of multiple booths positioned side-by-side and back-to-back with ducting connected to duct supports on the booth.

FIG. 5 shows a large series of booths in both side-to-side and back-to-back configuration. Booths 60a and 60b are positioned back-to-back, and thus, the exhaust tubing braces 32a are touching and a single exhaust connection 62 is used. As can be seen, the main tubing 63 exhausts to the outside with each pair of booths connected along the main tubing route. Electrical is provided, using conduit 64 with connections to each booth. One can clearly see that in this configuration, several booths can be positioned in a relatively small space on the floor, and conveniently be exhausted at the same time.

Figure 6:
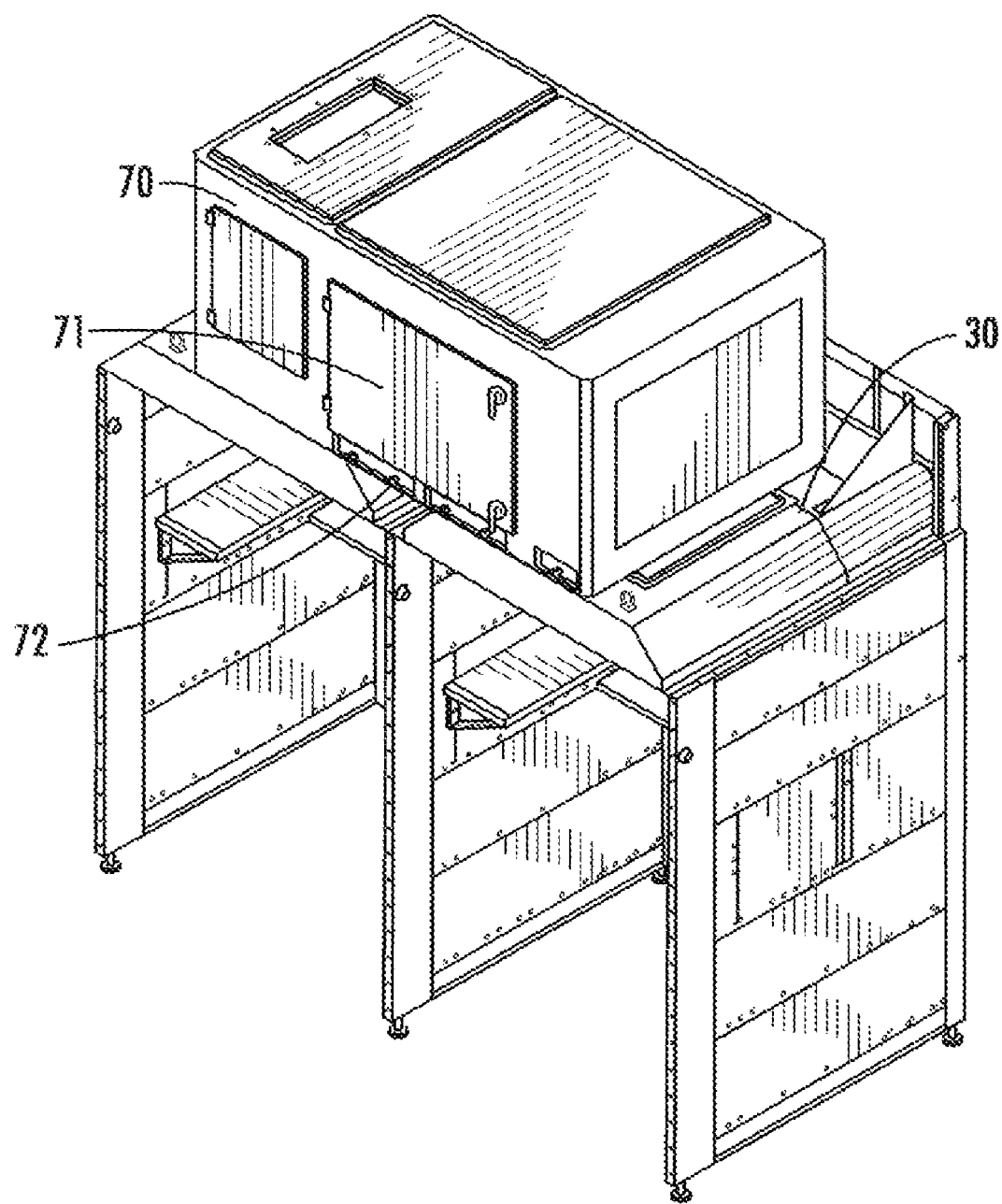
FIG. 6 is a perspective view of roof mounted ventilation.

FIG. 6 depicts a perspective view of an embodiment of the present invention where there is a roof mounted filtration system spanning two booths of the present invention. In this embodiment roof 30 has roof mounted filter system 70. The roof mounted filter system 70 can contain paper filters screens or any other type of filtration unit or means normal for welding type environments. Access to the filter is by door 71 and particulate clearing can be accessed by drawers 72. By using a single filtration system 70 a further benefit of the present invention is obtained.

It is clear to one skilled in the art that the drawings herein, are not intended to be limiting. Variations on materials number of attached booths accessories in the booth and the like are within the skill in the art in view of the present disclosure. Nothing in the claims is therefore intended to be limited by the drawings.

What is claimed is:

1. A welding booth designed to attach to one or more like welding booths comprising:
   a) a left and right side panel wall;
   b) a back work panel wall comprising a duct support mounted to a top surface of the panel;
   c) a plurality of leveling feet;
   d) a roof positioned on the top surface of the side and back panels with a roof mounted exhaust extraction port; and
   e) one or more adjustable slots positioned in at least one of the panels or the roof;
   wherein the side and back panels are adapted such that a side or back panel can become the side or back panel of a second welding booth attached to the welding booth.

2. A plurality of welding booths according to claim 1 wherein there are at least two welding booths joined together which share a common side wall.

3. A plurality of welding booths according to claim 1 wherein there are at least two welding booths joined together which share a common back wall.

4. A welding booth according to claim 2 or 3 which further comprise a fume arm positioned within the booth.

5. A welding booth according to claim 1 wherein there is an exhaust duct connected to the extraction port and supported by the duct support.

6. A welding booth according to claim 1 which further comprises one or more adjustable slots in the roof.

7. A welding booth according to claim 1 wherein the roof is supported on a top surface of the side and back panels.

8. A welding booth according to claim 1 wherein the back wall is designed to support at least one of the group selected from ducting, gas lines and wiring.

9. A welding booth according to claim 1 which further comprises a roof mounted air filtration system.

10. A welding booth according to claim 9 wherein a single roof mounted air filtration system is used to span and filter two welding booths positioned either side-by-side or back-to-back.

\* \* \* \* \*